April 15, 1952 — W. A. RAY — 2,592,952
THERMOELECTRIC CONTROL SYSTEM
Filed Feb. 26, 1949
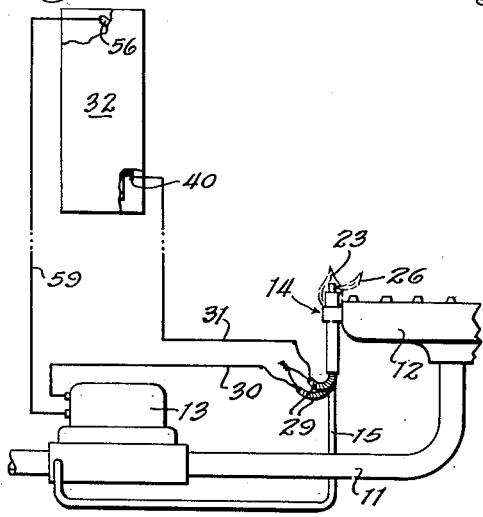
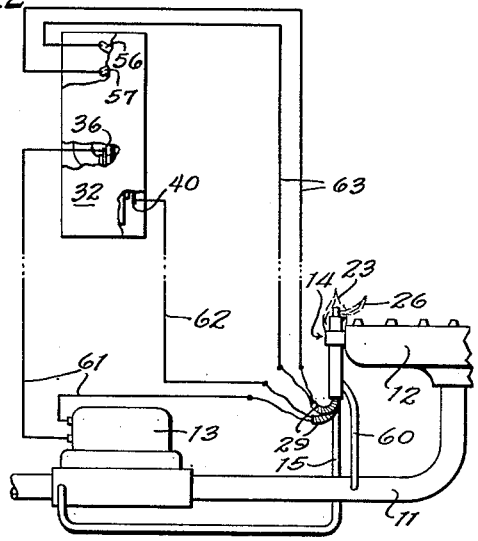
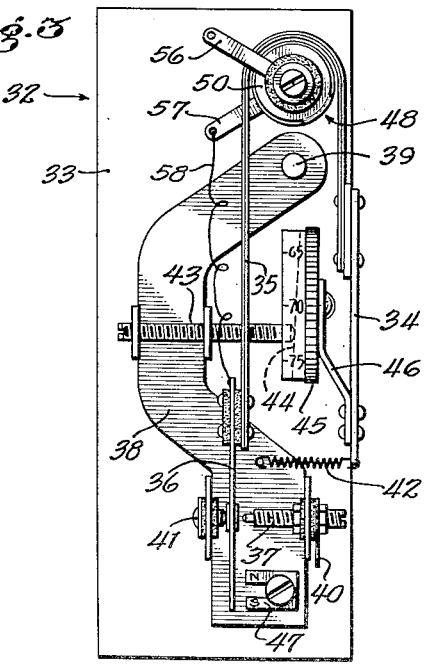
INVENTOR,
WILLIAM A. RAY
By John H. Rouse,
ATTORNEY.

Patented Apr. 15, 1952

2,592,952

UNITED STATES PATENT OFFICE 2,592,952

THERMOELECTRIC CONTROL SYSTEM

William A. Ray, North Hollywood, Calif., assignor to General Controls Co., Glendale, Calif., a corporation of California Application February 26, 1949, Serial No. 78,595

4 Claims. (Cl. 236—68)

1

This invention relates to thermoelectric control systems, and more particularly to the use of thermoelectricity in the control of gas-consuming space heaters.

There are, in common use, space-heating systems which comprise a thermostat-controlled electric valve for supplying gas to the main burner, and, as the sole source of electrical energy, a thermoelectric generator heated by the flame of the pilot burner. Such systems, an example of which is disclosed in my Patent No. 2,294,694, have met with favorable acceptance, particularly in the domestic heating field, because of their inherent gas-shut-off safety feature (in the event of extinguishment of the pilot burner), and the fact that the control is independent of any "outside" electric service.

A desirable feature lacking in such systems is "heat anticipation," which is accomplished by supplying "artificial" heat electrically to the space thermostat, while the same is in heat-demanding condition, so as to shorten the burner-on periods and thereby avoid overrun of heat from the furnace. Heretofore it has been considered, by manufacturers of control apparatus, impossible to incorporate the feature of heat-anticipation in a system energized solely by a pilot-burner-heated thermoelectric generator because of the small amount of electrical energy produced by the generator, and the relatively large amount of current consumed by the heater in the heat-anticipating thermostat employed in existing systems energized by current from the outside service lines. Evidence of the foregoing is found, for example, in the Lange Patent No. 2,265,294, assigned to Minneapolis-Honeywell Regulator Co. wherein it is stated (in reference to a conventional thermoelectrically-energized system of the character described above) on page 1, column 1, lines 36–38: "Furthermore, certain features desirable in a control system such as 'heat anticipation' cannot be used in such an arrangement."

However, I have discovered that by arranging the "artificial" heater in an effective manner a suitable degree of heat-anticipation can be produced in an ordinary thermostat with expenditure of electrical energy in an amount not substantially greater than is required by the sensitive electrically-controlled valve employed in a conventional thermoelectrically-energized gas-heating control system.

It is therefore a general object of this invention to incorporate the feature of heat-anticipation in a heating control system energized solely by thermoelectricity produced by consumption of fuel-gas in an amount not substantially in excess of that consumed by a pilot burner of the conventional type which requires about one cubic foot of gas per hour to produce a stable flame.

For full understanding of the invention, and further appreciation of its objects and advantages, reference is to be had to the following detailed description and accompanying drawing, and to the appended claims.

In the drawing:

Figures 1 and 2 are schematic views of space-heating control systems embodying my invention;

Figure 3 is a front elevation of the thermostat employed in the systems of Figs. 1 and 2;

Figure 4 is a detail view of a preferred form of electric heater element;

Figure 5 is a perspective view of the heater unit shown in the thermostat of Fig. 3 and which comprises the heater element of Fig. 4; and Figures 6 and 7 are, respectively, plan and side-elevational views of the thermoelectric-generator assembly employed in the control system of Fig. 1.

Referring first more particularly to the control system of Fig. 1 (the modified system of Fig. 2 to be described subsequently) and to Figs. 3–7, the numeral 11 indicates a conduit which is connected to supply ordinary fuel-gas to a main burner 12 under the control of an electrically controlled valve 13. This valve may be of the diaphragm type operated by the pressure of the gas supply and controlled by a sensitive electromagnetic pilot-valve adapted to be energized by power of the order of 5–15 milliwatts; an example of such a valve being disclosed in my aforementioned Patent No. 2,294,694.

Mounted on the main burner 12 is a pilot-burner assembly 14 which is shown per se in Figs. 6 and 7; the assembly being shown in Fig. 1 as rotated through 90° from its position as seen in Figs. 6 and 7. The assembly comprises a gas-supply pipe 15 (connected to the inlet side of valve 13) which carries a hollow bracket 16 having a pair of annular auxiliary burners 17—18 supplied with gas from said pipe. The bracket is bored centrally of the burners to receive thermoelectric generators 19—20. These generators may be generally the same as those disclosed in Ray Patent No. 2,407,517, and each comprises a series of thermocouples arranged longitudinally within a cylindrical jacket 21—22 with the hot-junctions of the couples in the upper part of the jacket heated by the flames 23 of burners 17—18.

Projecting from the top of the bracket 16, as an extension of pipe 15, is a burner head 24 having an orifice 25 for a flame 26 which serves to ignite the main burner. The burner head is slotted as indicated at 27 so that small flames 28 are produced which so join the flames 23 and 26 that in the event of accidental extinguishment of one of the flames it is immediately relighted by the other.

As shown in Fig. 1, one lead of each of the cables 29 of the thermoelectric generators 19—20 is connected to the other, and the remaining leads connected to wires 30—31 which extend respectively to valve 13 and to a thermostat 32 which, it is to be assumed, is located in, and is responsive to the ambient temperature of, a room or space heated by the main burner 12; the generators 19—20 being so interconnected that they are in series-aiding relation.

The thermostat 32 is shown in detail in Fig. 3 and comprises a base 33 upon a turned-up marginal portion of which one side-arm of a U-shaped bimetallic member 35 is rigidly mounted. Insulatingly secured to the free end of the other side-arm of the bimetallic member is a contact arm 36 which cooperates with a contact screw 37 carried by a generally-flat adjusting member 38 which is pivotally mounted on the base 33 at 39 and lies between the base and the bimetallic member in spaced relation to the latter. The contact screw 37 is insulatingly mounted in a turned-up side portion of the adjusting member 38 and is provided with a terminal 40 to which the wire 31, shown in Fig. 1, is connected. Insulatingly mounted in an opposite turned-up side portion of member 38 is a rivet 41 which serves as a back-stop for contact arm 36. The adjusting member 38 is tensioned in counterclockwise direction by a spring 42; its movement in that direction being limited by a screw 43, threaded in turned-up side portions of the member and extending freely through an opening in bimetallic member 35, which bears against the inclined inner surface 44 of an adjusting disk 45 rotatably mounted on an arm 46 secured to the side portion 34 of the base. It will be clear that by rotating disk 45 the contact screw 37 and stop 41 can be moved, as a unit, with respect to contact arm 36 to adjust the setting of the thermostat. Mounted on the lower part of member 38 is a permanent magnet 47 which cooperates with contact arm 36 in a well-known manner to impart snap-action to the thermostat; the contact arm 36, of course, being of magnetic material.

Mounted on the thermostat base 33 by a screw 53, and in the fork of the bimetallic member 35, is an electric heating unit 48 which is shown per se in Fig. 5. The heating element is preferably in the form of a thin narrow strip 49 of resistance material having apertured enlargements 50—51 at each end, as can be seen in Fig. 4. The strip is wound helically around a cylinder 52 of insulating material and is secured in place by means of the screw 53 which passes through a central opening in the cylinder and clamps the bent-over enlargements 50—51 of the strip to the ends of the cylinder; insulating washers (one of which is indicated at 54) being interposed between the individual enlargements 50—51 and the screw-head and nut 55. Clamped by the screw and nut to the respective ends of the resistance strip are terminal lugs 56 and 57. The heating unit 48 is self-orienting, i. e., it presents the same area of heating surface to the bimetallic member regardless of the position to which it may be turned in mounting.

In the system of Fig. 1, the heater terminal 57 is connected to the contact arm 36 by a flexible wire 58 (Fig. 3), and the terminal 56 is connected to the valve 13 by a wire 59, so that when the thermostat is in heat-demanding condition (contact arm 36 in engagement with fixed contact 37) a circuit is formed which includes, in series: generator 19, generator 20, wire 30, electromagnetic pilot-valve of valve 13, wire 59, terminal 56, heater element 49, terminal 57, flexible wire 58, contact arm 36, fixed contact 37, terminal 40, and wire 31. It is thus clear that when the thermostat contacts close in response to demand for heat in the space, the valve 13 is energized to supply gas to the main burner, and, simultaneously, current flow through the heating unit 48 is initiated; the "artificial" heat produced by unit 48 effecting opening of the thermostat contacts sooner than such opening would occur solely in response to the rise of ambient temperature. Inasmuch as the thermoelectric generators are supplied, by pipe 15, from a point ahead of valve 13, the thermoelectric energy is normally continuously generated. In the event of accidental extinguishment of the flames 23, 26, the resultant cessation of generation of electrical energy effects closing of the valve so that gas cannot pass to the main burner until these flames are relighted.

The combined resistance of the generators 19—20 is preferably made approximately equal to the resistance of the coil of the electromagnetic pilot valve, plus the resistance of the heater element 49, plus the normal line-resistance. The resistance of the heater element 49 should be about the same as that of the electromagnet coil, or preferably slightly higher so that a somewhat greater amount of power is expended in the heater. The amount of power required for operation of the valve is 5–5 milliwatts, and I have found that when the heater is arranged as shown in Fig. 3, heat in an amount sufficient to effect the usual desired degree of heat-anticipation can be produced by an expenditure of 10–25 milliwatts in the heater when the bimetallic member is of a size commonly used in room-thermostats. As an example: I have found that when the space temperature is maintained a degree or so below the temperature for which the thermostat is set, the expenditure of 20 milliwatts in the heater then effects opening of the contacts in about three minutes.

The capacity of the generator burners 17—18 is such that each consumes about one-half cubic foot per hour of ordinary fuel-gas, and the production of the igniting flame 26 requires an additional one-half cubic foot, so that the total consumption of the assembly is about one and one-half cubic feet per hour. The gas-consumption of a conventional standard pilot-burner (when its heat is not recovered, as in a storage water-heater) is about one cubic foot per hour, this amount being required to achieve "flame stability," i. e., avoidance of extinguishment due to drafts or the "pop back" shock which sometimes accompanies the lighting of the main burner.

Each of the generators 19—20, when heated by ordinary gas in the amount of about one-half cubic foot per hour, is capable of delivering about 25 milliwatts; the open-circuit voltage of each generator being about one-quarter volt. Obviously, a single larger generating device, having the same wattage output, could be substituted for the dual generating devices shown in Figs. 6 and 7.

While, for better confining of the heat and for ease of assembly, the heating unit is preferably constructed and arranged, as shown in Fig. 3, in the fork of the U of the bimetallic member, it may be of different construction and mounted in some other way so that it is in good heat-transfer relation to the bimetal, but preferably close to the U-bend (or the fixed end of the bimetal) since a bimetallic member is most "active" at the point where the "leverage advantage" is greatest.

In the system of Fig. 2, the thermoelectric generator for energizing the heater unit 48 is connected in a circuit separate from that of the generator for energizing the valve; the burner for heating the heater-energizing generator being supplied with gas by way of a separate pipe 60 which is connected to conduit 11 at the outlet side of the valve, so that when the valve opens gas passes to this burner where it is ignited by the flame issuing from the slot 27. The dual pilot-burner assembly of Fig. 2 is the same as that in Fig. 7 except for the provision of a separate fuel supply for each generating device; the device for energizing the valve being connected to the gas-supply conduit ahead of the valve, while the device for energizing the heater is connected at the outlet of the valve.

As is shown in Fig. 2, the valve 13 is electrically connected, through the thermostat, to its associated generator by wires 61—62 which lead from the generator (in series with the valve) to the contact arm 36 and fixed-contact terminal 40 of the thermostat. The other generator is connected by wires 63 directly to the terminals 56—57 of the electric heater; the flexible connection 58 being eliminated in this arrangement. While, for sake of clarity, four wires are shown extending to the remote thermostat, in practice one lead of each generator is preferably connected (in a well-known manner) to a "common" wire which forms part of the circuit of both the valve and the heater, so that a conventional three-wire cable is then employed. As compared with the arrangement of Fig. 1, the arrangement of Fig. 2 has the disadvantage of requiring a three-wire in place of a two-wire cable, but the advantage that continuous consumption of gas (during the off-period of the main burner) is reduced since there is flame only at the valve-energizing device (and at the main-burner pilot) while the valve is closed.

The specific embodiments of my invention herein shown and described are obviously susceptible of modification without departing from the spirit of the invention, and I intend therefore to be limited only by the scope of the appended claims.

I claim as my invention:

1. In a heating control system for a space: a gas burner for supplying heat to said space; a sensitive electrically-controlled valve for controlling the supply of gas to said burner; a thermostat, responsive to the ambient temperature of said space, for controlling the energization of said valve; an electric heater, in good heat-transfer relation to said thermostat, for supplying "artificial" heat to the thermostat while the same is in heat-demanding condition; a thermoelectric generator for supplying electrical energy to both said valve and said heater; and an auxiliary gas-burner for heating said thermoelectric generator, said auxiliary burner having a capacity such that its consumption of ordinary fuel-gas is not in excess of about two cubic feet per hour.

2. In a heating control system for a space: a gas burner for supplying heat to said space; a valve for controlling supply of gas to said burner, said valve being of the pressure-operated type which includes an electromagnetic pilot-valve operatively energizable by electric power not in excess of 25 milliwatts; a thermostat, responsive to the ambient temperature of said space, for controlling the energization of said pilot-valve and thereby the operation of said burner-supply valve; an electric heater, in good heat-transfer relation to said thermostat, for supplying "artificial" heat to the thermostat while the same is in heat-demanding condition, said heater being adapted to consume electrical power not substantially in excess of that consumed by said electromagnetic pilot-valve; and a thermoelectric generator for energizing both said pilot-valve and said heater and having an electrical capacity substantially only sufficient for such energization.

3. In a heating control system for a space: a main gas-burner for supplying heat to said space; a conduit for supplying gas to said main burner; a valve in said conduit for controlling the supply of gas to the main burner, said valve being of the pressure-operated type which includes an electromagnetic pilot-valve operatively energizable by electric power not in excess of 25 milliwatts; a first thermoelectric generator for energizing said pilot-valve and having an electrical capacity substantially only sufficient for that purpose; a first auxiliary gas-burner, connected to said conduit ahead of said main-burner supply valve, for heating said first generator; a thermostat, responsive to the ambient temperature of said space, for controlling the energization of said pilot-valve and thereby the operation of said main-burner supply valve; an electric heater, in good heat-transfer relation to said thermostat, for supplying "artificial" heat to the thermostat, said heater being adapted to consume electrical power not substantially in excess of that consumed by said electromagnetic pilot-valve; a second thermoelectric generator for energizing said heater and having an electrical capacity substantially only sufficient for that purpose; and a second auxiliary gas-burner, connected to said conduit at the outlet side of said main-burner supply valve, for heating said second generator.

4. In a thermoelectrically-energized system for controlling the heating of a space: a main gas-burner for supplying heat to said space; a gas-consuming pilot-burner assembly adapted to produce a flame for igniting said main burner, said assembly also including a thermoelectric generator and means for producing a flame for heating said generator; means for supplying gas to said assembly for production of said flames in an amount not in excess of that required by a standard "one-cubic-foot" pilot-burner; a sensitive electrically-controlled valve for controlling supply of gas to said main burner, said valve being electrically connected to said generator and adapted to be operatively energized by the small amount of energy produced thereby; a thermostat, responsive to the ambient temperature of said space, for controlling the energization of said valve; an electric heater, in good heat-transfer relation to said thermostat, for supplying "artificial" heat to the thermostat while the same is in heat-demanding condition; and additional thermoelectric generating means forming part of said pilot-burner assembly, and heated by flame produced thereat, for energizing said heater, the amount of gas consumed by said additional generating means being not in excess of that required for production of said first-mentioned flames.

WILLIAM A. RAY.

REFERENCES CITED

The following references are of record in the file of this patent:

UNITED STATES PATENTS

| Number | Name | Date |
|---|---|---|
| 1,583,496 | Shafer | May 4, 1926 |
| 2,129,477 | Parks | Sept. 16, 1938 |
| 2,159,342 | Persons | May 23, 1939 |
| 2,255,917 | Donley | Sept. 16, 1941 |
| 2,280,353 | Ray | Apr. 21, 1942 |